April 23, 1963     T. R. THOMAS     3,086,617
LUBRICATION SPRAY DEVICE
Filed Aug. 22, 1960     5 Sheets-Sheet 1

INVENTOR.
THOMAS R. THOMAS
ATTORNEY

April 23, 1963 T. R. THOMAS 3,086,617
LUBRICATION SPRAY DEVICE
Filed Aug. 22, 1960 5 Sheets-Sheet 2

INVENTOR.
THOMAS R. THOMAS
BY
ATTORNEY

April 23, 1963 T. R. THOMAS 3,086,617
LUBRICATION SPRAY DEVICE
Filed Aug. 22, 1960 5 Sheets-Sheet 3

INVENTOR.
THOMAS R. THOMAS
BY
ATTORNEY

April 23, 1963 T. R. THOMAS 3,086,617
LUBRICATION SPRAY DEVICE
Filed Aug. 22, 1960 5 Sheets-Sheet 4

INVENTOR.
THOMAS R. THOMAS
BY
ATTORNEY

April 23, 1963 T. R. THOMAS 3,086,617
LUBRICATION SPRAY DEVICE
Filed Aug. 22, 1960 5 Sheets-Sheet 5

INVENTOR.
THOMAS R. THOMAS
BY
ATTORNEY

3,086,617
LUBRICATION SPRAY DEVICE
Thomas R. Thomas, New York, N.Y., assignor to Auto Research Corporation, Dover, Del., a corporation of Delaware
Filed Aug. 22, 1960, Ser. No. 51,186
9 Claims. (Cl. 184—56)

The present invention relates to lubricating systems and it particularly relates to a spray application of coolants and lubricants to cutting and grinding operations or for the application of oil or lubricants to chain gears and other devices to be supplied with lubricant.

It is among the objects of the present invention to provide a central control unit which will serve to prepare and enable transmission of a spray or mist of a coolant-lubricant composition which may be conveyed to or applied to various types of mechanisms and particularly chain gears at suitable locations remote from the source of the lubricant.

Another object is to provide a novel system which will be readily adaptable to a wide variety of types of standard water base coolants and which will be readily adapted to various types of viscosities of oil and which will permit remote or adjacent application of a spray of coolant and lubricant in cutting and grinding operations, and to applications to chain gears in a wide variety of mechanical elements.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most suitable to provide a central combination air trap or air dehydrator unit and filter unit which will receive compressed air from a standard source and in which there will also be incorporated a pressure regulator including an air pressure reduction and liquid pressurizing device to form the spray or dispersion of the coolant and/or the lubricant or oil for remote application.

The central source will receive the compressed air supply from a shop source and the feed of such air will be controlled by valve means desirably of a solenoid type with duplicate tubing lines then conveying the air and the liquid from the control unit to the jets from which the spray is applied to the cutting or grinding operation or to the chain gears or other mechanical element.

In one embodiment of the invention the device has a metal head unit which carries a large liquid coolant reservoir, for example of five gallon capacity and also a smaller upper air inlet chamber which serves as an air cleaner and air dehydrator. The head has a connection for receiving air under pressure and it has separate air and liquid outlets to feed into the two-pipe system which will lead to places where the coolant is to be applied.

Each of the outlets desirably has a liquid flow adjustment and is provided with a concentric or parallel piping arrangement by means of which a spray is applied to the cutting or grinding operation or to the particular machine elements which it is desired to lubricate and/or cool.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Referring to FIGS. 1 to 5, there is shown a head A which carries the reservoir B.

The reservoir B has an upper compartment C serving as an air dehydrator compartment.

Figure 1:
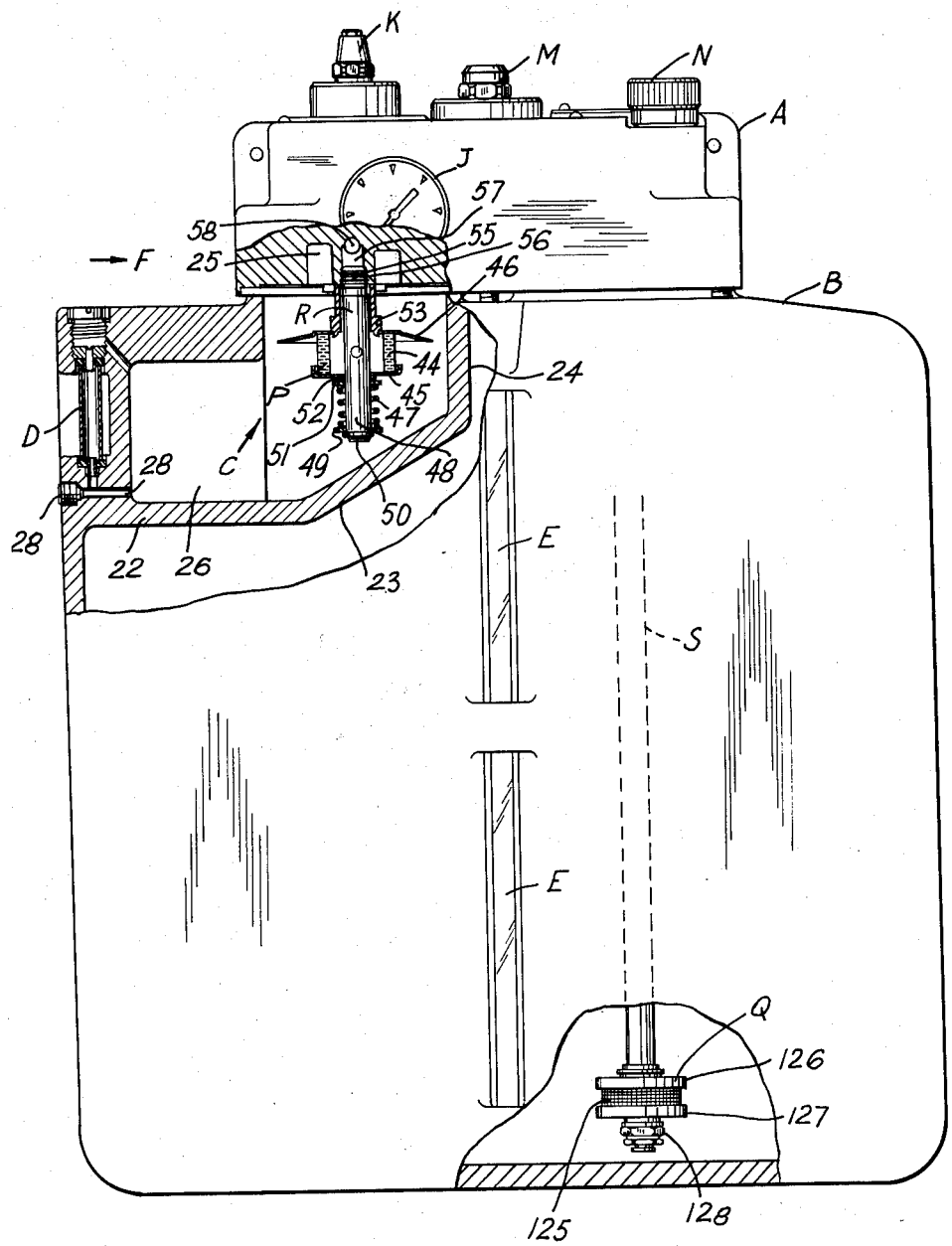
FIG. 1 is a front elevational view of one form of spray unit partly sectioned more clearly to show the interior construction thereof.
Figure 2:
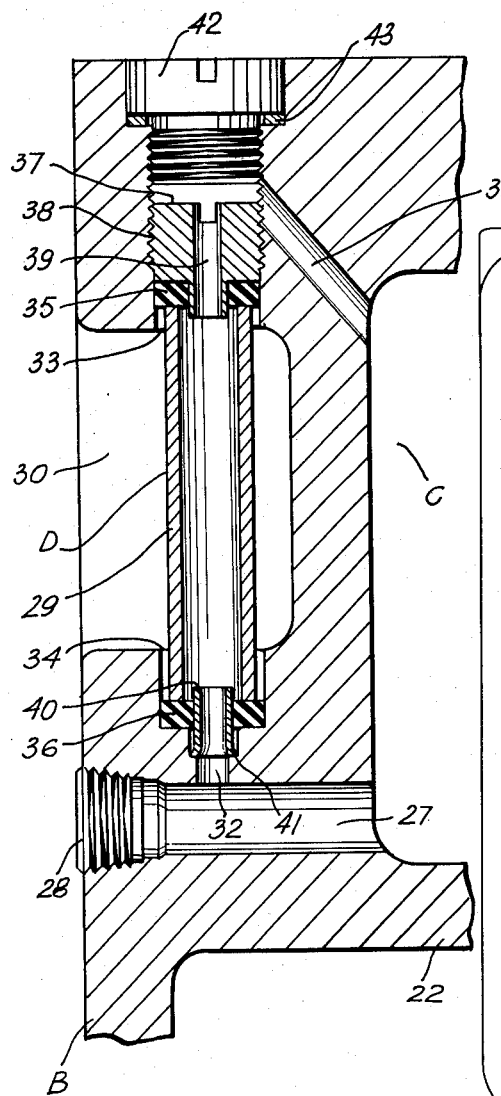
FIG. 2 is a side sectional view upon an enlarged scale, showing the liquid level gauge in the upper air chamber.
Figure 4:
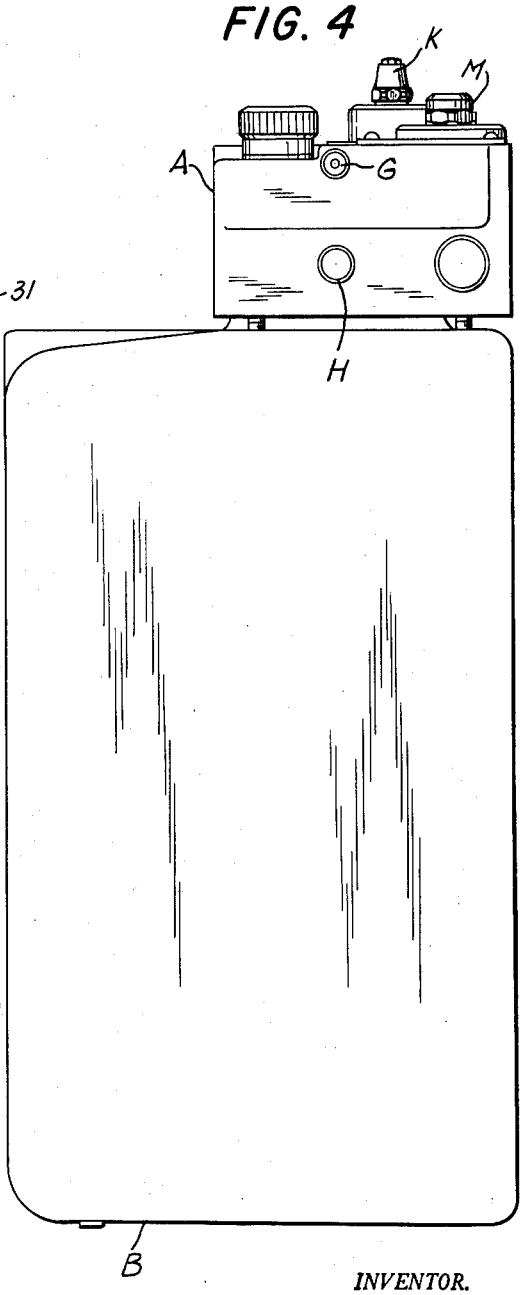
FIG. 4 is a side elevational view of the unit of FIG. 1.

The air reservoir compartment has a sight glass D shown in small scale in FIG. 1 and in large scale in FIG. 2, and the main reservoir also has a sight glass arrangement E show best in FIG. 1.

Figure 5:
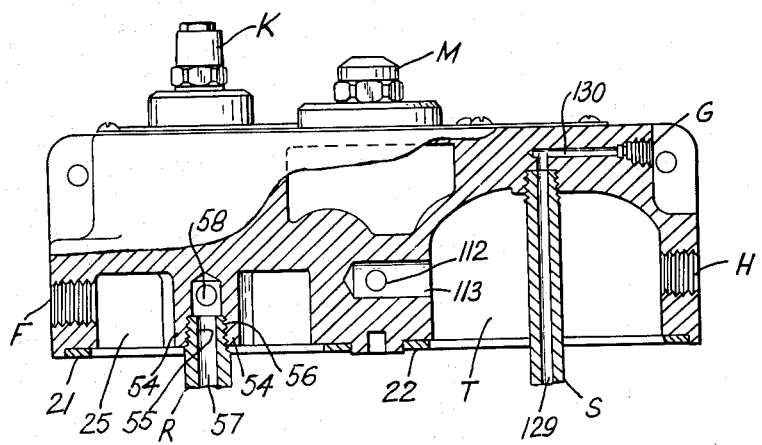
FIG. 5 is a transverse sectional view of the head taken upon the line 5—5 of FIG. 3.

The head unit A is provided with the air inlet F and with liquid or coolant outlets G and H respectively (see FIG. 5).

Figure 7:
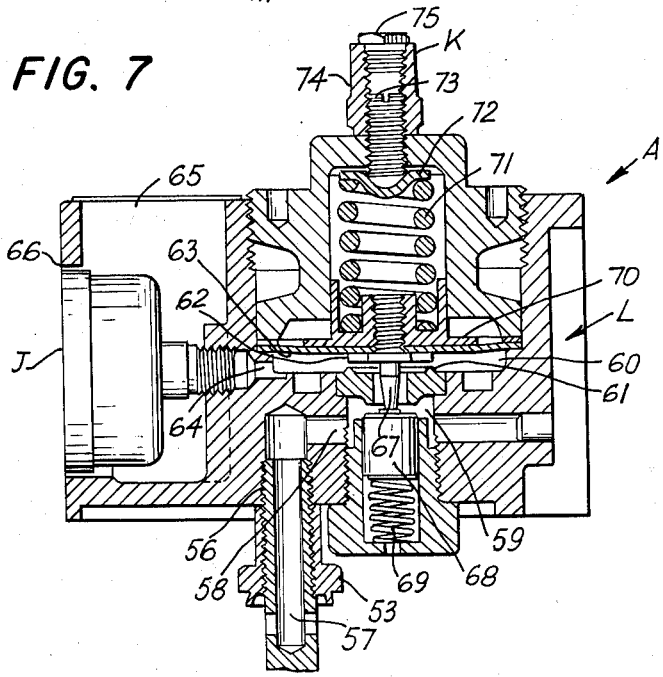
FIG. 7 is a transverse vertical sectional view taken upon the line 7—7 of FIG. 3.

The head A is provided with a pressure gauge J and with a pressure regulator adjustment K associated with the spring-pressed diaphragm control valve L (see FIG. 7).

The head A is also provided with the solenoid control valve M.

The coolant or lubricant filler cap N permits filling of the reservoir B with the liquid coolant.

The air filter P (see FIG. 1) will separate the moisture or undesirable material which flows in through the air inlet F, and the coolant filter Q will filter out the impurities in the coolant or lubricant in the main reservoir B before the compressed air and the coolant respectively flow out through the vertical outlet tubes R and S respectively.

Figure 8:
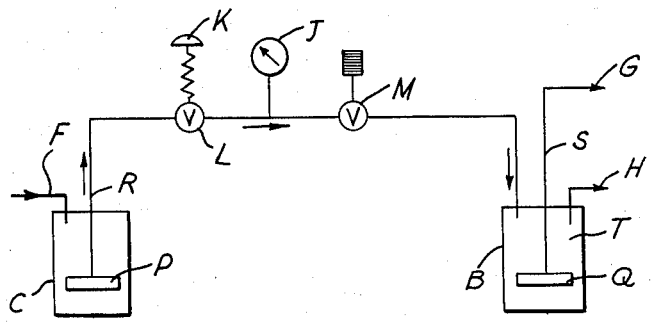
FIG. 8 is a diagrammatic lay-out of the flow diagram showing the flow of coolant air through the apparatus and chambers of FIGS. 1 to 7.

Referring to the diagrammatic lay-out of FIG. 8, the flow diagram shows the air inlet F supplying the air to the air container or dehydrator chamber C provided with the outlet strainer or filter P and having the outlet flow line R.

The air will then flow past the diaphragm regulating valve L having the spring adjustment K and past the gauge J.

It will then pass the solenoid actuated cut-off valve M into the coolant reservoir B.

From the coolant reservoir B, the coolant is forced out through the strainer or filter Q through the outlet vertical pipe S to the outlet G.

The air at the same time passes across the top of the reservoir B and flows out through the air outlet H.

A novel feature of the present invention resides in the fact that the air pressure in the dome portion T of FIG. 5 will act as the propellant to propel the lubricant through the distributing system.

Figure 10:
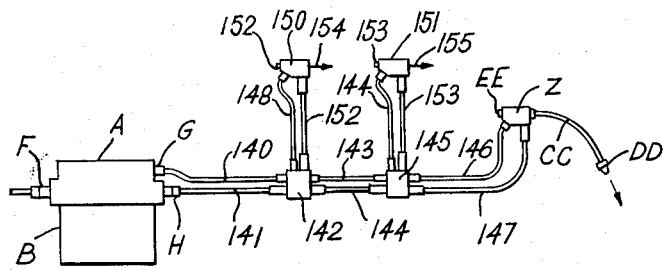
FIG. 10 is a diagrammatic lay-out, showing the application of the control unit of the present invention to several spray outlet fittings, by separate coolant and compressed air tubing connections.

In the lay-out of FIG. 10 the cleaned air and the cleaned coolant liquid will flow into an external parallel or concentric tubing element through the outlets G and H.

Figure 9:
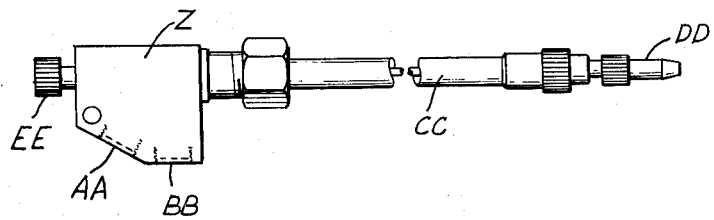
FIG. 9 is a diagrammatic side elevational view of an outlet connection by which a spray is directly applied to a grinding or cutting operation or to a mechanical element to be lubricated.

In FIG. 9 there is shown a typical remote outlet by means of which the mist is discharged onto the cutting or grinding operation or onto the mechanical element.

Referring to FIG. 9, there is shown the typical outlet unit Z having a conduit connection at AA from the liquid connection G and an air connection BB from the air connection H of the unit shown in FIGS. 1 to 7.

Thus, the air and liquid will then flow through the concentric double tubing unit CC to the spray jet nozzle DD which will apply the mist or spray directly onto the place where it is to be applied with the liquid usually being in the central passageway and the air being in the passageway surrounding it. The adjustment EE permits regulation of the liquid flow through the liquid inlet AA.

Figure 3:
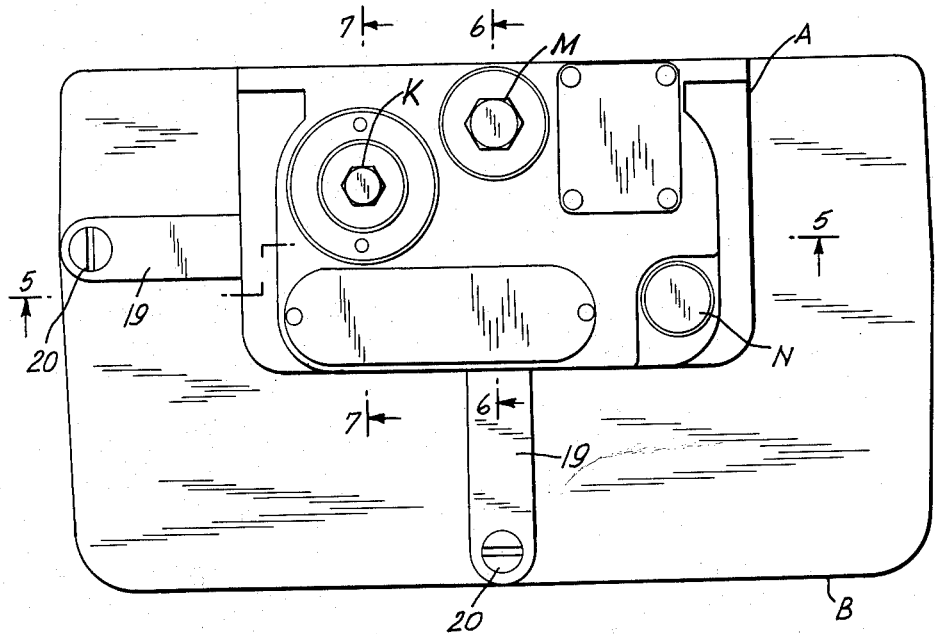
FIG. 3 is a top plain view of the unit of FIG. 1.

Referring specifically to FIGS. 1 and 2, there is a head A which is joined to a reservoir casing or housing B by means of straps 19 and bolted connections such as are indicated at 20 (see FIG. 3).

The gaskets 21 and 22 (see FIG. 5) will make a tight connection to the top of the reservoir B and to the top of the air dehydrator chamber C.

The major portion of the reservoir B will contain coolant, while the upper separating wall structure 22, 23 and 24 will form the air dehydrator chamber C.

The compressed air will normally flow into the tapped inlet F in the side of the head A and then into the space 25 and down into the chamber C.

Any moisture that is in the air flowing in through the inlet F will accumulate in the bottom portion 26 of the chamber C and it may be drained out through the passageway 27 by opening the plug 28 in the side of the reservoir.

Referring to FIG. 2, there is shown the sight glass D which indicates the accumulation of water or other debris in the chamber C.

The sight tube 29 is observable through a pocket 30 in the side of the reservoir and in the side of the chamber C and connection is provided by the oblique bore 31 at the top of the sight glass 29 and by the bore 32 at the bottom of the sight glass 29.

The upper and lower ends of the sight glass are received in the sockets 33 and 34 and held in liquid- and airtight condition by the gaskets 35 and 36.

The nut 37 screwed into the tapped recess 38 with the central bore 39 will establish communication between the oblique bearings and the interior of the sight glass 29 and will also serve to clamp the tube 29 into position against the gaskets 35 and 36.

The lower end of the tube has the insert nipple 40 establishing communication thereinto from the bore 32 and the transverse passageway 27.

The nipple 40 fits against the shoulder 41. The top of the tapped portion 38 is closed by means of the plug 42 and the gasket 43.

From the chamber C the air will then pass through the ceramic filter center 44, which is held in position between the cup 45 and the shield 46 by the spring 47 on the tube 48.

The annular ring 49 will contact the end of the spring and hold it in position on the lower end 50 of the closed bottom tubular member R.

The upper end of the spring 47 reacts against the annular ring 51, which presses up against the gasket or O-ring 52.

The shield 46 is held in position by means of the sleeve 53, which extends up to the nipple 54 extending down from the head A and encircled by the inlet chamber 25.

The tubular member R has an upper threaded portion 55 which is threaded into the tapped recess 56 in the depending portion 54 in the head A.

The air, after filtration, will then pass through the bore 57 and then into the passageway 58 (see FIG. 5).

Referring to FIG. 7, the air will flow into the chamber 59 and then into the chamber 60.

The chamber 60 has a valve seat 61 which may be contacted by the plate 62 carried by the diaphragm 63.

This chamber 60 is in communication at 64 with the gauge J which is mounted in the chamber 65 and visible through the opening 66 in the upper portion of the head A.

The valve plate 62 on the diaphragm 63 will normally be pressed upwardly by the stud 67, which contacts the plunger member 68 pressed upwardly by the spring 69.

The diaphragm is pressed downwardly by the presser plate or foot 70 and the spring 71, which has a top contact plate 72.

The top contact plate 72 is adjustable by means of the screw 73 to vary the pressure on the spring 71.

The screw 73 is held inside of the sleeve 74, which is closed by means of the cap nut 75, forming part of the adjustment K.

When the air presses up on the diaphragm it will lift the plate 62 away from the valve seat 61, permitting the air to pass from the chamber 59 into the chamber 60.

This diaphragm, together with the spring 71, is set so as to regulate the air pressure which flows in through the air dehydrator chamber C and into the system. The air pressure is then observed from the gauge J on the front of the head A.

The air, after it passes the chamber 60 will flow through the bore 100 (see FIG. 6) into the chamber 101 and then into the chamber 102.

The chamber 102 is above the solenoid valve seat 103 with the reciprocating valve 104 on the lower end of the armature 105 opening or closing the valve seat 103.

The solenoid 106 may be operated by an electric switch (not shown) which is turned on by turning on the machine. The energization of the solenoid 106 will serve to lift the closure valve 104 from the valve seat 103. The stroke of the armature 105 may be adjusted by means of the cap 107.

The air that flows past the valve seat 103 will pass into the vertical bore 108 and then into the lateral bore 109 and the peripheral chamber 110 into the oblique bore 111.

Figure 6:
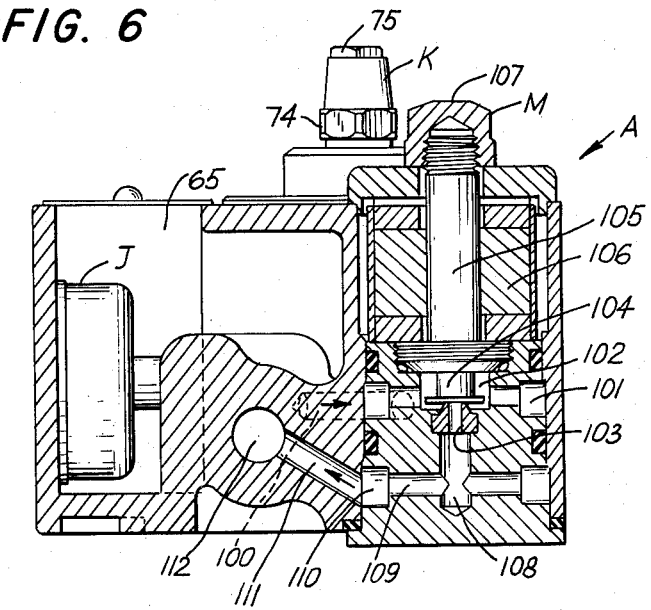
FIG. 6 is a transverse sectional view taken upon the line 6—6 of FIG. 3.

From the oblique bore 111 the compressed air will then flow into the passageway 112 (see FIG. 6).

This passageway 112, as indicated in FIG. 5, leads directly into the bore 113 which admits air under pressure to the chamber T above and in direct communication with the coolant in the reservoir B (see FIG. 5).

The air will then flow across the chamber T and out through the outlet H in FIG. 5 to the external line.

The air pressure in the reservoir B and in the dome portion T will force coolant through the strainer Q.

The strainer Q consists of a strainer cylinder 125 (see FIG. 1) held between the cups 126 and 127, which are held together by means of the nut 128.

The coolant will be forced up through the tube S and through the bore 129 and then into the bore 130 to the outlet opening G (see FIG. 5).

In the external system the coolant and air will pass through the parallel lines to the bearings to be lubricated, as shown in FIG. 10.

As indicated in FIG. 10, the coolant will flow from the outlet G into the parallel tube system 140 for the coolant and 141 for the compressed air.

The air and coolant will flow to the junction 142 and then through the parallel system 143 and 144 to the junction 145 and then through the parallel tubing 146 and 147 to the unit Z, which may be of the type shown in FIG. 9.

From the junctions 142 and 145, the coolant will flow through the branched tubes 148 and 149 to the outlet units 150 and 151 parallelly with the compressed air 152 and 153.

The adjustments 152 and 153, which may be nipple valves, will regulate the mixture of finely divided coolant and air which flows out through the outlets 154 and 155 to the point of application.

In operation, the pressure of the air above the coolant will force the coolant through the external tubing 140, 143, 146, 148 and 149 to the units Z, 150 and 151, from which the air and coolant may be combined to form spray, as indicated at 154 and 155, or fed through a concentric tubular connection CC to the spray outlet DD.

These units 150 and 151 and Z may be applied to a suitable place of drilling, boring, cutting or grinding to give an adequate spray of coolant thereat.

The character of the spray is regulated by the adjustments 152, 153 and EE and the diaphragm valve of FIG. 7 will regulate the pressure, while the solenoid valve of FIG. 6 will turn the air pressure on and off as the machine goes into operation or stops.

Additional coolant is supplied through the filler cap N when required to fill up the reservoir, while the air is automatically supplied from a source of compressed air through the inlet F.

Both the coolant and air will be filtered, the air by the filter P and the coolant by the filter unit Q.

The apparatus as shown is particularly designed for the spray application of coolant to cutting and grinding operation or for the application of oil to chains, gears and other points to be lubricated. The present application is a continuation in part of application Serial No. 657,807 filed May 8, 1957 now Patent No. 2,954,846 dated October 4, 1960 which corresponds to French Patent No. 1,209,111.

Having now particularly described and ascertained the nature of the invention, and in what manner the same is to be performed, what is claimed is:

1. A central pressure and control source for supplying compressed air on one hand and lubricant and coolant liquid on the other hand to a plurality of applicator units, a rectangular head block having top, bottom, inlet end, outlet end, front and back sides with a pressure dome recess in the bottom side adjacent the outlet end side and extending upwardly toward the top side, a lubricant and coolant reservoir depending from and mounted on said head, said pressure dome recess being in communication with said reservoir, said reservoir having an upper separate air receptacle therein in one of the corners thereof to receive the compressed air and to filter and dehydrate the same, a conduit system supplying air under pressure to said air receptacle and then to said pressure dome recess and also supplying the air and liquid under pressure to outlets from said liquid reservoir, and parallel conduits to deliver said air and liquid from said outlets to said applicator units, and means to mix said air and liquid.

2. A central pressure and control source for supplying compressed air on one hand and lubricant and coolant liquid on the other hand to a plurality of applicator units, a rectangular head block having top, bottom, inlet end, outlet end, front and back sides with a pressure dome recess in the bottom side adjacent the outlet end side and extending upwardly toward the top side, a lubricant and coolant reservoir depending from and mounted on said head, said pressure dome recess being in communication with said reservoir, said reservoir having an upper separate air receptacle therein in one of the corners thereof to receive the compressed air and to filter and dehydrate the same, a conduit system supplying air under pressure to said air receptacle and then to said pressure dome recess and also supplying the air and liquid under pressure to outlets from said liquid reservoir, and parallel conduits to deliver said air and liquid from said outlets and to said applicator units, and means to mix said air and liquid, said conduit system also receiving a pressure regulating unit and a solenoid control valve to regulate the flow from the air receptacle to the liquid reservoir.

3. A central pressure and control source for supplying air on one hand and lubricant and coolant liquid on the other hand to a plurality of applicator units, a rectangular head block having top, bottom, inlet end, outlet end, front and back sides with a pressure dome recess in the bottom side adjacent the outlet end side and extending upwardly toward the top side, a lubricant and coolant reservoir depending from and mounted on said head, said pressure dome recess being in communication with said reservoir, said reservoir having an upper separate air receptacle therein in one of the corners thereof to receive the compressed air and to filter and dehydrate the same, a conduit system supplying air under pressure to said air receptacle and then to said pressure dome recess and also supplying the air and liquid under presssure to outlets from said liquid reservoir, and parallel conduits to deliver said air and liquid from said outlets and to said applicator units, and means to mix said air and liquid, and said head block receiving pressure regulating and valving members.

4. A central pressure and control source for supplying air on one hand and lubricant and coolant liquid on the other hand to a plurality of applicator units, a rectangular head block having top, bottom, inlet end, outlet end, front and back sides with a pressure dome recess in the bottom side adjacent the outlet end side and extending upwardly toward the top side, a lubricant and coolant reservoir depending from and mounted on said head, said pressure dome recess being in communication with said reservoir, said reservoir having an upper separate air receptacle therein in one of the corners thereof to receive the compressed air and to filter and dehydrate the same, a conduit system supplying air under pressure to said air receptable and then to said pressure dome recess and also supplying the air and liquid under pressure to outlets from said liquid reservoir, and parallel conduits to deliver said air and liquid from said outlets to said applicator units, and means to mix said air and liquid, said reservoir having parallel tubular outlet members extending into the air receptacle and the reservoir from said head and serving as conduits for air and lubricant and coolant from said receptacle and reservoir into said head.

5. A central pressure and control source for supplying air on one hand and lubricant and coolant liquid on the other hand to a plurality of applicator units, a rectangular head block having top, bottom, inlet end, outlet end, front and back sides with a pressure dome recess in the bottom side adjacent the outlet end side and extending upwardly toward the top side, a lubricant and coolant reservoir depending from and mounted on said head, said pressure dome recess being in communication with said reservoir, said reservoir having an upper separate air receptacle therein in one of the corners thereof to receive the compressed air and to filter and dehydrate the same, the base of the reservoir serving respectively as an air receptacle and a liquid reservoir, a conduit system supplying air under pressure to said receptacle and then to said pressure dome recess and also supplying the air and liquid under pressure to outlets from said liquid reservoir, and parallel conduits to deliver said air and liquid from said outlets to said applicator units, and means to mix said air and liquid, said head block having a single pressure air inlet and a plurality of pressure air and liquid outlets.

6. A central pressure and control source for supplying air on one hand and lubricant and coolant liquid on the other hand to a plurality of applicator units, a rectangular head block having top, bottom, inlet end, outlet end, front and back sides with a pressure dome recess in the bottom side adjacent the outlet end side and extending upwardly toward the top side, a lubricant and coolant reservoir depending from and mounted on said head, said pressure dome recess being in communication with said reservoir, said reservoir having an upper separate air receptacle therein in one of the corners thereof to receive the compressed air and to filter and dehydrate the same, a conduit system supplying air under pressure to said air receptacle and then to said pressure dome recess and also supplying the air and liquid pressure to outlets from said liquid reservoir, and parallel conduits to deliver said air and liquid from said outlets to said applicator units, and means to mix said air and liquid, said head block carrying a pressure regulator and a solenoid valve and also carrying said conduit system.

7. A central control source for air pressure and liquid coolant to supply through separate parallel conduits air pressure and liquid coolant to cutting and grinding operations remote from the source where the air pressure and coolant are mixed and propelled onto the operation as a finely divided jet, said coolant being propelled to said operation by said air pressure, said source comprising a rectangular control head block having top, bottom, inlet end, outlet end, front end, back sides and said block having a compressed air inlet at the inlet end side and a compressed air outlet and a liquid coolant outlet at the outlet end side and a large pressure dome recess in the bottom side of the block adjacent the outlet side end and a small inlet air pressure recess in the bottom of the block adjacent the inlet end side and passageways for conducting the air pressure through the block from the inlet to the small recess to the large recess and to the compressed air inlet and for conducting the lubricant from the large dome recess to the liquid coolant outlet, and a large rectangular container having an upper corner compressed air chamber and a main liquid coolant reservoir chamber, an obliquely disposed corner wall separating the chambers, said container having openings in the top thereof to be mounted against and enclosing the recesses, one opening coinciding with the small recess and being at the top of the air chamber and the other opening coinciding with the large recess and being at the top of the coolant chamber and vertically depending air and coolant tubular conduits extending down to the bottom of said chambers respectively and extending centrally up through said small air recess and large dome recess respectively from the air and coolant chambers and connecting to said passageways and conducting air and lubricant from said chambers upwardly to said passageways.

8. The source of claim 7, each tubular conduit having a concentric filter mounted on its lower end and said chambers having external vertical sight glasses on the container to show the liquid level in said chambers.

9. The source of claim 7, said head block having solenoid and air control pressure valves on the passageways leading from the small recess to the large recess in the sequence stated and having an air pressure gauge on the front side of the block above the small recess.

References Cited in the file of this patent

UNITED STATES PATENTS

| | | |
|---|---|---|
| 951,234 | Cannon | Mar. 8, 1910 |
| 1,990,524 | Bystricky | Feb. 12, 1935 |
| 2,691,428 | Thomas | Oct. 12, 1954 |
| 2,868,584 | Faust | Jan. 13, 1959 |
| 2,998,021 | Becker | Aug. 29, 1961 |

FOREIGN PATENTS

| | | |
|---|---|---|
| 1,188,352 | France | Mar. 9, 1959 |
| 1,209,111 | France | Sept. 21, 1959 |